United States Patent
Jenkins

[11] 3,976,356
[45] Aug. 24, 1976

[54] OPTICAL DIELECTRIC WAVEGUIDES

[76] Inventor: Richard Charles Lloyd Jenkins, 35 St. Mary's Avenue, Alverstoke, Gosport, Hampshire, England

[22] Filed: Sept. 3, 1974

[21] Appl. No.: 502,641

[30] Foreign Application Priority Data
Sept. 6, 1973 United Kingdom............ 42066/73

[52] U.S. Cl. .......................... 350/96 WG; 350/96 R
[51] Int. Cl.² .......................................... G02B 5/14
[58] Field of Search .............................. 350/96 WG

[56] References Cited
UNITED STATES PATENTS

| | | |
|---|---|---|
| 3,434,774 | 3/1969 | Miller............................ 350/96 WG |
| 3,535,017 | 10/1970 | Miller............................ 350/96 WG |
| 3,666,348 | 5/1972 | Marcatili....................... 350/96 WG |
| 3,712,705 | 1/1973 | Marcatili....................... 350/96 WG |
| 3,813,141 | 5/1974 | Miller............................ 350/96 WG |

Primary Examiner—John K. Corbin
Assistant Examiner—Stewart Levy
Attorney, Agent, or Firm—Donald D. Jeffery

[57] ABSTRACT

An optical dielectric waveguide comprises a track made of a low loss material disposed in the form of a helix. Information in the form of a modulated light can be transmitted along said track. Preferably said substance is silica.

19 Claims, 15 Drawing Figures

OPTICAL DIELECTRIC WAVEGUIDES

BACKGROUND OF THE DISCLOSURE

Optical dielectric waveguides are of great interest at present in the field of communications, as they are potentially capable of conveying large amounts of information per unit time over relatively long stage lengths.

Those types of optical dielectric waveguides so far proposed, that are potentially suitable for long distance optical communication systems, consists essentially of a fibre with a low loss core surrounded or "cladded" by a sheath of transparent material with a refractive index of 1% or more less than that of the core. In order to be able to make such fibres it is necessary that the material of the core and sheath have compatible thermal and mechanical properties. In single mode cladded fibres the core has a diameter of a few microns and this allows only the $HE_{11}$ mode to propagate. In multimode cladded fibres the core diameter is about 50 microns or larger. The outer diameter of the sheath is not critical provided it is sufficiently larger than that of the core.

Over distances of about a kilometer, multimode fibres can have bandwidths of up to about 1 GHz. However certain materials have such low losses that stage lengths of some 20 kilometers are possible. Over such large distances the bandwidths of multimode fibres become only about 20 MHz or less. This bandwidth can be increased under some circumstances by allowing a certain amount of intermode conversion to occur but this usually leads to an increase in the loss of the fibre. Single mode fibres on the other hand can have bandwidths of up to about 50GHz over a distance of a kilometer and of about 11 GHz over a distance of 20 Kilometers if the carrier frequency spread is sufficiently small. If the carrier frequency spread is about 400 GHz however these possible bandwidths are reduced to about 6GHz and 300 MHz respectively. Even so a single mode fibre has a capacity greatly in excess of that of multimode fibres over distances of interest for long range high capacity communication systems.

A major difficulty in making cladded fibres is to find two suitable low loss materials with compatible thermal and mechanical properties. At present pure silica with a loss of about 2dB per kilometer has the lowest loss yet known. The only low loss material known at the moment that is suitable for cladding pure silica is a high boron content binary borosilicate glass. Multimode fibres of this type have been made with losses of about 7dB per kilometer. An alternative is to clad a core, made of silica doped with suitable impurities to raise its refractive index slightly, with pure silica. Multimode fibres have been made in this way with losses as low as 2dB per kilometer. Doping a material in this way can however substantially increase its material dispersion. Thus single mode cladded fibres with cores doped in this way could have rather lower bandwidths than might otherwise be expected.

A variant of the cladded fibre in which there is no material compatibility problem is the liquid filled multimode fibre. Such fibres are made by filling hollow fibres with a low loss fluid having a sufficiently high refractive index. Liquid filled single mode fibres are not a practical proposition because of the inordinate time it would take to fill them with liquid. A second variant of the cladded fibre that also has no material compatibility problem consists of a hollow fibre with an inner fibre running along its centre axis and supported by a thin flat plate, all the components being made of the same low loss material. In this case the inner fibre forms the core, and air, the thin plate and to a lesser extent the outer fibre act as the cladding. This type of fibre can be used in either multimode or single mode form according to the size of the inner fibre. Multimode fibres of this type have been made out of pure silica with a loss of about 5dB per kilometer.

Single mode cladded fibres have so far nearly always been found to have substantially higher losses than the corresponding multimode cladded fibres. As at least a fifth of the energy of a single mode fibre is carried in the cladding this is easy to understand when the cladding has a much higher loss than the core. When this is not the case the reason is probably due to the fact that while intermode conversion does not necessarily increase the loss in multimode cladded fibres, in single mode cladded fibres it always does. Thus inhomogeneities in the core and cladding as well as irregularities in the core cladding interface (where the intensity is high in single mode cladded fibres) are the probable cause of the increased loss of single mode cladded fibres.

SUMMARY OF THE INVENTION

One object of the present invention is to provide an improved optical dielectric waveguide.

Another object of the present invention is to provide an optical waveguide made entirely of a single low loss material.

Another object of the present invention is to provide an optical waveguide in which mode conversion is very small for low modes under a wide range of conditions.

Another object of the present invention is to provide an optical waveguide in which the low modes either have a very low mode dispersion, or alternatively the mode dispersion of the two lowest (degenerate) modes can be adjusted largely to cancel the material dispersion of the low loss material employed. If only the two lowest modes are initially excited then in the former case the corresponding single mode bandwidth is almost entirely determined by the material dispersion of the low loss material and the carrier frequency spread of the source. In the latter case this single mode bandwidth is even greater depending now on the residual dispersion that remains rather than on the material dispersion of the low loss material.

According to the present invention there is provided an optical dielectric waveguide comprising a track mode of a low loss material disposed in the form of a helix.

Preferably the helix has a pitch angle in the range of 70° to 87°. With a pitch angle in this range the length of the helical track exceeds the actual length of the helix by only about six percent at most.

BRIEF DESCRIPTION OF THE DRAWINGS

FIG. 4 is a cross-section of the complete track of the type shown in FIG. 2a;

DESCRIPTION OF THE PREFERRED EMBODIMENTS

Figure 1:
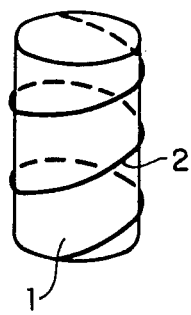
FIG. 1 is a view of a helical track in an optical waveguide constructed in accordance with the present invention.

As shown in FIG. 1, an optical dielectric waveguide comprises a cylindrical core 1 in which is mounted a helical fibre track 2 of low loss homogeneous material such as pure silica.

Figure 2A:
FIGS. 2a and 2b are cross-sections through part of two possible types of the helical track of FIG. 1.
Figure 2B:

In negotiating the helical track a beam of light is confined, due to the centripetal acceleration to which it is continually being subject, to essentially the region of the track to which it has access, that lies most remote from the principal axis of the helix. FIGS. 2a and 2b respectively show cross-sections through that region of first and second possible types of track with which the beam of light is substantially confined.

Referring to FIG. 2a, it will be seen that the first type of track has a sector shaped cross-section such that the angle at its apex is constant, preferably being of about 90°, and the adjoining sides are straight. The apex of this region of the track is always directed radially outward with respect to the principal axis of the helix and the space that surrounds this region of the track is occupied either by air or by a transparent substance having a refractive index not greater than about 95 percent of that of the material of the track itself and having sufficiently low loss. In these circumstances the two lowest electromagnetic modes, which differ only in their state of polarisation, are almost entirely confined within the region of the track being considered, provided the sides adjoining the apex exceed a length of about $1.9 \rho^{1/3}\lambda^{2/3}$, where $\rho$ is the radius of curvature of the helical track and $\lambda$ is the wavelength of the electromagnetic radiation within the track material. As the intensity of these modes is very small in the immediate neighbourhood of the apex, small deviations from the preferred cross-section of the track in this region do not have too serious consequences provided any changes in shape take place sufficiently gradually. Thus the corner at the apex could have a radius of curvature of up to about $0.3 \rho^{1/3}\lambda^{2/3}$. When the angle at the apex is 90° the intensity distribution corresponding to the two lowest degenerate modes have approximately circular symmetry. In this case it is found that a correctly orientated and positioned Gaussian input beam with a root mean square radius of about $0.258 \rho^{1/3}\lambda^{2/3}$ can couple about 95 percent of its power into these two modes. Mode dispersion of the lowest two modes is small compared to the material dispersion of pure silica. This implies that the bandwidth is determined by the material dispersion and the carrier frequency spread of the source.

Referring to FIG. 2b, it will be seen that the second type of track has a rectangular shaped cross-section defined between two substantially parallel flat surfaces. Two edges of these surfaces are joined by another flat surface which as shown in FIG. 2b forms a rectangular end to the cross-section. As discussed below, however, this other surface need not be of this precise form.

The end of the second type of track is also always directed radially outwards with respect to the principal axis of the helix and this region of the track is also surrounded either by air or by a transparent substance having a refractive index not greater than about 95 percent of that of the material of the track and having sufficiently low loss. If the sides of the track exceed a length of about $1.7\rho^{1/3}\lambda^{2/3}$ then the two lowest degenerate electromagnetic modes are almost entirely confined within this region of the track. The intensity distribution corresponding to these two modes does not have approximate circular symmetry in general. However if the width of the track is about $0.9\rho^{1/3}\lambda^{2/3}$ then they do, and in this case a Gaussian input beam with a root mean square radius of about $0.230\rho^{1/3}\lambda^{2/3}$ can couple about 95 percent of its power into these two modes. As the intensity of these modes is very low in the neighbourhood of the corners these corners can have radii of curvature of up to about $0.3\rho^{1/3}\lambda^{2/3}$. Mode dispersion of the two lowest modes is again small compared to the material dispersion of pure silica. However the distance between opposite faces can be reduced so that the mode dispersion is about that of the material dispersion of pure silica and of opposite sign. This distance depends on the pitch angle of the track; it is found to be about $0.25\rho^{1/3}\lambda^{2/3}$ when this angle is 81°. In this case the total dispersion is very much reduced leading to a significant increase in bandwidth. However the intensity distribution of the lowest two modes no longer have approximate circular symmetry and the input beam would have to have an elliptical cross-section if it is to couple efficiently to the two lowest modes.

If the radius of the helix is $a$ and the pitch angle is $\alpha$ then the helix would have a pitch $p = 2\pi a \tan\alpha$, a radius of curvature $\rho = a \sec^2\alpha$ and a radius of torsion $\delta = a \sec\alpha \csc\alpha$. Therefore if $a = 250$ $\mu$m and $\alpha = 82°$ then $p = 11.18$mm, $\rho = 12.91$mm and $\delta = 1.81$mm. If the refractive index of the track material is $n = 1.45$ and the free space wavelength of the electromagnetic radiation is $\lambda_o = 0.84$ micron then $\lambda = \lambda_o/n = 0.5793$ microns and the lowest electromagnetic modes will be almost completely confined within the region of the track of the first type being considered provided the straight sides adjoining the apex exceed about 31 microns. These modes are similarly almost completely confined within the region of the track of the second kind provided the two parallel sides of the track exceed about 28 microns.

Figure 3A:
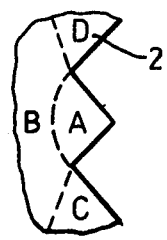
FIGS. 3a and 3b are cross-sections of possible forms of the two types of track.

When the length of the sides adjoining the apex of the track of the first type exceeds $1.9\rho^{1/3}\lambda^{2/3}$ then the track will be capable of supporting higher electromagnetic modes in addition to the two lowest. Instead of having a single intensity maximum these higher modes have two or more intensity maxima and they extend into regions of the track more and more remote from its apex. If the track actually has the first cross-section shown in FIG. 3a then it will not be able to support those modes that penetrate appreciably into region B, as such modes will tend to leak away into the regions C and D relatively rapidly.

Figure 3B:
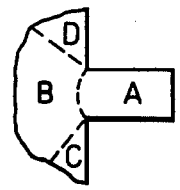

In the case of a track of the second type, many higher transverse modes in a direction perpendicular to the radius that are associated with the lowest radial mode will be supported even when the length of the sides are $1.7 \rho^{1/3}\lambda^{2/3}$. When the length of these sides exceeds $1.7\rho^{1/3} \lambda^{2/3}$, modes associated with the higher radial modes will be supported, these higher modes extending into regions more and more remote from the end of the track. If the track has the second cross-section shown in FIG. 3b then it will not be able to support those modes that penetrate appreciably into region B, as such modes will tend to leak away into the regions C and D relatively rapidly.

Due to the dispersion in the velocities of propagation of the various electromagnetic modes it can be shown that if any of the higher electromagnetic modes supported by the waveguide are excited to any significant extent then the bandwidth of this type of waveguide will be considerably reduced. If significant excitation of these modes by the input beam can be avoided then significant excitation can only occur by intermode conversion from the two lowest modes. If the helical track was perfectly regular and the track material was completely homogeneous then there would be no intermode conversion. However, when a waveguide of this type negotiates a bend the regularity of the helix is inevitably disturbed to some extent and some intermode conversion might be expected to occur. However, if the radius of the bend does not become less than about $20\rho$ no significant intermode conversion occurs. This is because the difference in the spatial frequency associated with the two lowest (degenerate) modes and those associated with any of the higher modes is much greater than the spatial frequency associated with such a bend. Of course mode conversion can occur between the two lowest modes but this does not matter as they have the same propagation velocity.

Therefore if only the two lowest modes are initially excited, it follows that this type of waveguide will operate as a single mode waveguide, provided bends satisfy the above criteria and intermode conversion due to other causes is negligible. Note that because the intensity of the low electromagnetic modes is so small in the immediate vicinity of the outer surface of the track, small surface irregularities should lead to little intermode conversion.

In the case of a track of the first type it is possible to choose the length of the sides adjoining the apex of the track so that the waveguide is capable of supporting only the two lowest modes over distances of interest. The required length is approximately given by $1.9 \rho^{1/3} \lambda^{2/3}$. If we consider a waveguide for which $a = 250$ microns, $\alpha = 82°$, $\rho = 8.29$mm and $\lambda_o = 0.84$ microns and assume the track is made of pure silica with a refractive index $n = 1.45$ and a loss of about 2dB per kilometer, then if the length of the sides of the track adjoining its apex is 31 microns the two lowest modes would have an additional loss due to leakage of less than 0.2dB per kilometer while all the higher modes would have an additional loss of at least 58dB per kilometer. This implies that if any of these higher modes were excited to a significant degree initially then they would be undetectable beyond a distance of about two kilometers provided of course that intermode conversion is sufficiently small. In this case any intermode conversion that does occur would not lead to a great reduction in bandwidth but to an increased loss.

Similarly if the lengths of the parallel sides of the second type of track is taken to be approximately either $1.7\rho^{1/3} \lambda^{2/3}$ or $1.8\rho^{1/3} \lambda^{2/3}$ according to whether the distance between these parallel sides is $0.9\rho^{1/3} \lambda^{2/3}$ or $0.25\rho^{1/3} \lambda^{2/3}$, this type of waveguide is only capable of supporting the lowest radial modes over distances of interest. However this does not mean that only the two lowest modes can be supported, because some of the higher modes of this type (that is associated with the lowest radial mode) will also have only relatively low additional loss due to leakage.

Figure 4:
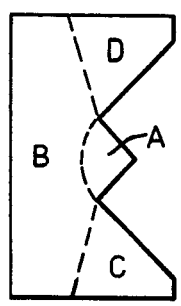
Figure 5:
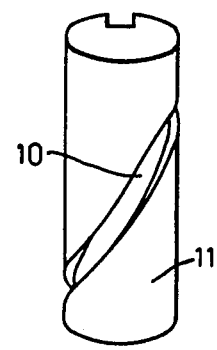
FIG. 5 is a view of a cylindrical core having a helical groove for receiving a fibre.

In the embodiment shown in FIG. 5 the fibre track consists of a fibre made of a low loss material and having a cross-section of the type shown in FIG. 4. Such a fibre can be manufactured by first of all making a preform with the required cross-section and then drawing it through a furnace in a conventional manner. After perhaps fixing the fibre in a suitable structural and protective covering it is then wound into a regular helical rectangular slot 10 cut into the surface of a suitable cylindrical cable 11 such that the apex of the track is always directed radially outward with respect to the axis of the cable. Of course more than one track could be embedded in the surface of the cable before the outer protective covering is applied.

This type of waveguide can typically have an external diameter of about 0.5 cm and be quite flexible to handle provided of course that when it is laid the necessary additional support is provided to ensure its radius of curvature satisfies the required criteria. If for instance $\alpha = 75°$ then its radius of curvature when laid would have to everywhere exceed about 75 cm.

Figure 6:
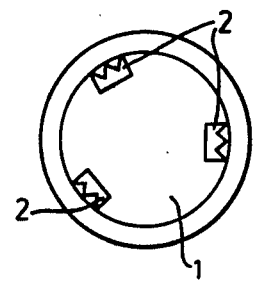
FIG. 6 is a cross-section of a further embodiment having three tracks of the kind shown in FIG. 4.

In the embodiment of FIG. 6 a preform of the track is made of a suitable low loss material such as pure silica and having a cross-section of the type shown in FIG. 4. This preform is then inserted into a slot cut near the surface of a cylindrical preform so that its apex is directed radially outwards with respect to the axis of the cylinder. Of course more than one track preform can be inserted into slots in the cylindrical preform. The case where three such preforms have been inserted is shown in FIG. 6. Then assuming the cylindrical preform has compatible thermal and mechanical properties to the track material, the cylindrical preform and the track preform(s) are drawn into a fibre in the conventional manner. Helical tracks are formed by either rotating the preform or drawn fibre (or both) at a controlled rate during the drawing process. The cylindrical preform does not have to be of low loss material. If the track itself is made of pure silica the cylindrical preform could be made of ordinary commercial silica. By drawing and twisting fibres in this manner helical waveguides can be produced which would have external diameters of about 500 microns or less. A lower limit to the size of such fibres is fixed by the requirement that their radius must be much greater than $0.6\rho^{1/3} \lambda^{2/3}$. This implies that such fibres could have external diameters as small as 100 microns.

Figure 7:
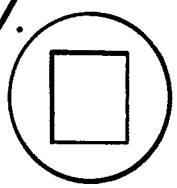
FIGS. 7 and 8 are cross-sections of two further embodiments having four tracks.
Figure 8:
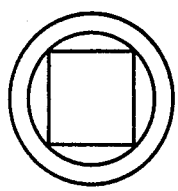
Figure 9:
FIG. 9 is a view of a length of the embodiments of FIGS. 7 and 8 but without cladding.

FIGS. 7, 8 and 9 illustrate an embodiment in which the preform consists of a rod made of a low loss pure silica with a square cross-section. This is drawn and twisted into a fibre as described above. Each corner then forming a helical track of the first type (FIG. 9). This fibre could then be cladded in a low loss fluorinated hydrocarbon copolymer. If this material has refractive index of 1.33 and a loss of about 1000 dB per kilometer then the additional loss of the waveguide due to this cladding would only be a fraction of the decibel per kilometer. Alternatively a loose F.E.P. (Fluorinated Ethylene Propylene) coating could be extruded around the fibre (FIG. 8). As the intensity of the low modes is so low in the immediate viscinity of the corners (assuming they are not too rounded) the additional loss caused by this coating is not very large.

Figure 10:
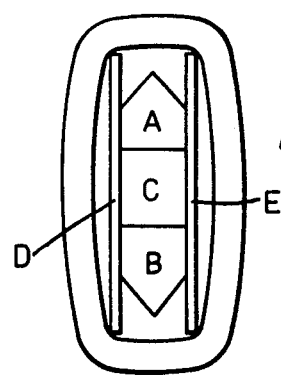
FIG. 10 is a cross-section of a further embodiment having two tracks.
Figure 11:
FIG. 11 is a view of a length of the embodiment of FIG. 10 but without cladding.

FIGS. 10 and 11 illustrate an embodiment consisting of two tracks of the first type. The preform (FIG. 10) is fabricated out of several separate pieces A, B, C, D and E, all having compatible thermal and mechanical properties. The parts A and B would be made of a low loss material. The ends of the parts D and E project beyond the vertices of the two tracks. The preform can be temporarily held together by applying heat to the outer surfaces of parts D and E so that they partially fuse together. When it is subsequently drawn and twisted into a fibre (FIG. 11) the various parts completely fuse together. The fibre could then have a loose coating extruded around it as shown in FIG. 10, the ends of parts D and E protecting the vertices of the two tracks. A great advantage of this embodiment is that it is relatively flexible to handle, and much less liable to fracture.

If the lengths of the sides of the two tracks are not too much greater than $1.9\rho^{1/3}\lambda^{2/3}$ and the parts D and E have the same refractive index (or less) than that of the two tracks then it is possible to provide this type of waveguide with a mode filter and a mode expander.

The filter consists of a straight section of the waveguide along which the angle of pitch is initially gradually increased to a value of about $$\cos^{-1}(\frac{\lambda}{l}\sqrt{\frac{a}{l}}).$$

where $l$ is the length of the sides of the track, and then, after a suitable distance, it is finally allowed to decrease gradually to its original value. This type of filter can be made by mechanically twisting the waveguide at each end of a portion of suitable length, so that the angle of pitch of this portion has the required increased value. Increasing the angle of pitch in this way increases the radius of curvature of the track to such values that all but the two lowest electromagnetic modes penetrate significantly into the ends of parts D and E (see FIG. 10) and hence leak away. For the "mode expander" the radius of curvature of the track is increased to such values at the end of the waveguide that the two lowest modes expand so that they almost completely occupy the end of the track. This eases the problem of launching light into the waveguide and any higher mode that might otherwise be significantly excited by the input beam is automatically filtered out before it has a chance to propagate.

Figure 12:
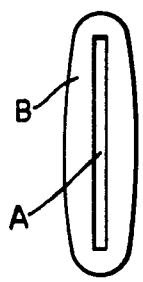
FIGS. 12 and 13 are cross-sections of two further embodiments having tracks of the type shown in FIG. 2b.
Figure 13:
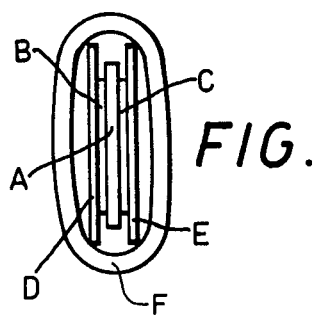

FIGS. 12 and 13 illustrate embodiments that have two tracks of the second type. In the first the preform consists merely of a flat sheet of low loss material such as pure silica which is then drawn and twisted into a fibre. It is then cladded with a low loss fluorinated hydrocarbon copolymer. If the distance between parallel faces is $0.9\rho^{1/3}\lambda^{2/3}$ then if this material has a refractive index of about 1.33 and a loss of 1000 dB per kilometer the additional loss due to the cladding is only a fraction of a decibel per kilometer. If on the other hand it was $0.25\rho^{1/3}\lambda^{2/3}$ or less then the corresponding loss is 10 decibels or more per kilometer. As an alternative, F.E.P. can be loosely extruded around the fiber. FIG. 13 shows an alternative embodiment which is fabricated in a similar manner to that shown in FIGS. 10 and 11. The end of the track in the fibre should project at least $1.7\rho^{1/3}\lambda^{2/3}$ or 1.8 beyond the ends of the supporting parts B and C in the fibre, according to whether the distance between the parallel edges is $0.9\rho^{1/3}\lambda^{2/3}$ or $0.25\rho^{1/3}\lambda^{2/3}$. The parts D and E protect the ends of the track when a coating F is extruded loosely around the fibre.

I claim:

1. An optical fiber for guiding optical electromagnetic wave energy comprising a unitary optically transparent structure characterized by a centrally disposed elongated filament having a longitudinal axis, and at least one helicoidal surface ridge surrounding said filament and extending helically along said axis, the cross-sectional dimensions and helical period p of said ridge being such that said optical wave energy can be propagated in at least one guided mode therethrough.

2. An optical dielectric waveguide having a longitudinal axis and comprising a track of a low loss material, said track being disposed in the form of a helix circumscribing said longitudinal axis whereby energy propagated through the waveguide is constrained to propagate along said track by centripetal action.

3. A waveguide according to claim 2 wherein the helix has a pitch angle in the range of 70° to 87°.

4. A waveguide according to claim 2 wherein said material is homogeneous.

5. A waveguide according to claim 2 wherein said material is pure silica.

6. A waveguide according to claim 2 comprising a plurality of said tracks.

7. A waveguide according to claim 2 wherein said track is disposed adjacent to an outer peripheral edge of a helical member of said material, said edge being formed where two surfaces of said member meet at an angle.

8. A waveguide according to claim 7 wherein said angle is about 90°.

9. A waveguide according to claim 7 dimensioned to propagate substantially only a single mode.

10. A waveguide according to claim 7 incorporating a mode filter and mode expander.

11. A waveguide according to claim 2 wherein said track is disposed between two substantially parallel surfaces terminated by a third surface.

12. A waveguide according to claim 11 wherein said third surface is substantially perpendicular to said two substantially parallel surfaces.

13. A waveguide according to claim 11 wherein the distance between said two substantially parallel surfaces is such that the standard deviations of the intensity distribution of the two lowest modes in any two directions perpendicular to the direction of propagation are substantially equal.

14. A waveguide according to claim 11 wherein the distance between said two substantially parallel surfaces is such that the mode dispersion of the two lowest modes substantially cancels the material dispersion of said low loss material.

15. The optical fiber of claim 1 in which said filament and said helicoidal surface ridge are formed of the same optically transparent material.

16. The optical fiber of claim 1 in which said filament has an essentially circular cross-section of radius $r$ at least an order of magnitude greater than the wavelength of the optical wave energy to be propagated through said ridge.

17. The optical fiber of claim 16 in which the helical period $p$ of said ridge is in the range of 17 to 120 times the radius $r$ of said filament.

18. The optical fiber of claim 1 including a plurality of helicoidal surface ridges spaced apart about the exterior surface of said filament, the spacing $c$ between any two adjacent surface ridges being at least twice the cross-sectional width $a$ of each of said ridges.

19. The optical fiber of claim 15 in which said optically transparent material is fused silica.

* * * * *